United States Patent Office.

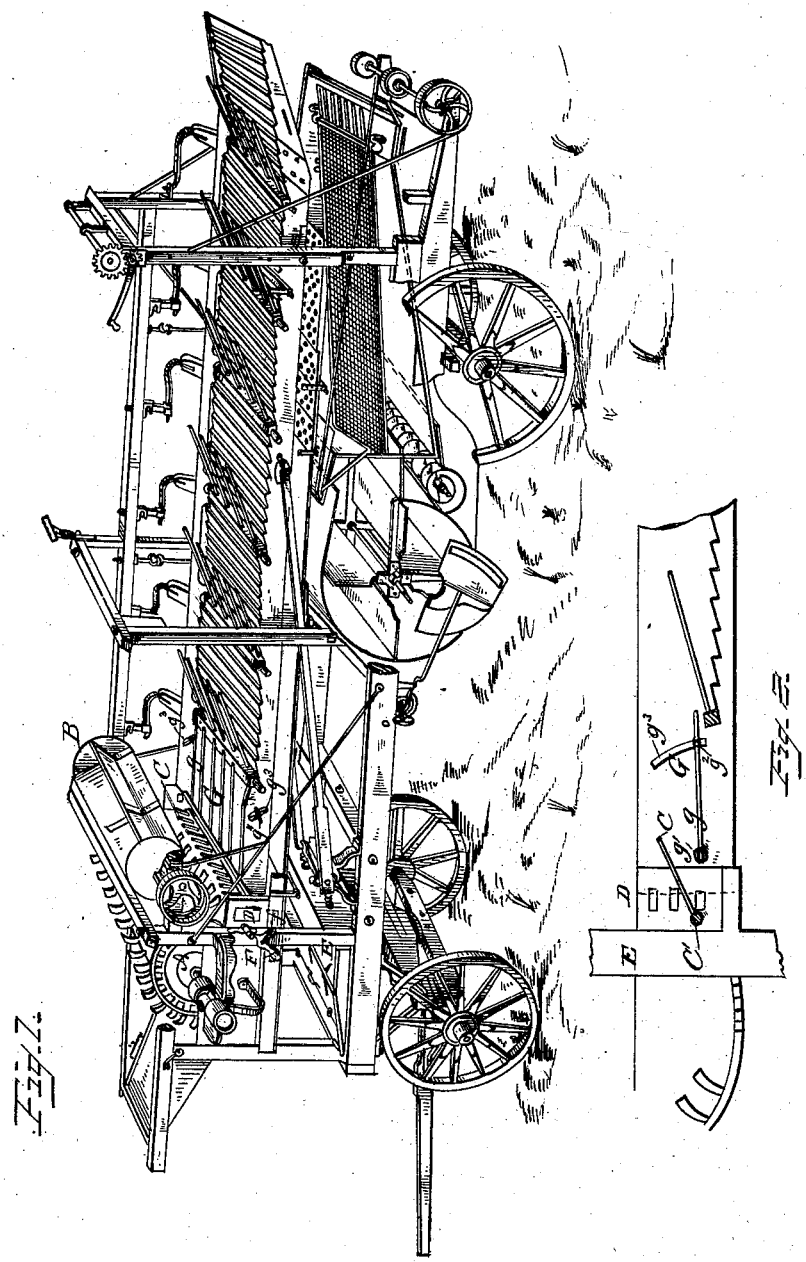

ANDREW J. HOAG, OF BATTLE CREEK, MICHIGAN, ASSIGNOR TO NICHOLS, SHEPARD & COMPANY, OF SAME PLACE.

THRASHING-MACHINE.

SPECIFICATION forming part of Letters Patent No. 293,876, dated February 19, 1884.

Application filed December 4, 1883. (No model.)

*To all whom it may concern:*

Be it known that I, ANDREW J. HOAG, of Battle Creek, county of Calhoun, State of Michigan, have invented new and useful Improvements in Thrashing-Machines, of which the following is a full and exact description, reference being had to the accompanying drawings, making part of this specification, in which—

Figure 1 is a perspective view of a thrashing-machine with the side or inclosing boards or case removed, showing my improvements applied. Fig. 2 is a section of a portion of a concave and also a section of the upper shaker or screen, showing the grating and the means for adjusting the same.

In thrashing-machines as heretofore constructed great difficulty has been experienced in properly separating the grain from the straw, as the straw would become matted and hold the grain and allow it to escape to the stack. Various methods have been employed to remedy this defect, and while they have been successful to a certain extent, yet it is found that more or less grain still escapes with the straw. Among these methods for remedying this defect has been to arrange a beater to beat the grain from the straw as it leaves the thrashing-cylinder, and while this method has been found to remedy the defect to a certain extent, it has still been open to a serious objection, as no method was employed whereby the direction or angle of the straw in relation to the beater could be adjusted by the attendant to guide the straw properly to the beater under its varying conditions and subject it more or less to the action of the beater.

The object of my invention is to remedy this defect, and also to provide additional means whereby the grain, after having been thoroughly beaten out, is retarded for a sufficient time at the receiving end of the shaker to insure the escape of the grain to the lower shaker or screen; and to this end my invention consists in the combination, with the beater arranged above the concave and with the fingers arranged at the discharge end of the concave, of mechanism for changing and holding the fingers at different inclinations with respect to the beater.

It further consists in a vibrating shaker provided with grating-bars at its receiving end running lengthwise of the machine, whereby the escape of the grain to the lower shaker is greatly facilitated.

It further consists in a vibrating shaker constructed with the said section of grating hinged thereto, so that the same may be adjusted in relation to the beater, and in certain details in the construction and arrangement of parts, all as hereinafter described, and pointed out in the claims.

In the accompanying drawings an ordinary thrashing-machine of the "vibrator" class is shown, having the usual shaker or screen, fan, &c., and the machine (except so far as the parts enter into the combinations claimed) will not be herein described, and may be constructed in any usual or preferred manner.

In rear of the cylinder A, and just above the same, is arranged the beater B, which may be driven in any usual or preferred way. At the rear or discharge end of the concave are mounted the fingers C, the shaft C', to which the same are connected, having its bearings in the bracket D, connected to the front faces of the upright frame-timber E. The end of the shaft C' extends out beyond the side of the frame-timber, and has an arm or lever, F, connected thereto. This arm or lever is provided with an oblong slot, $f$, through which it is connected, by means of a bolt and thumb-nut, to the side of the frame-timber E, and by means of which devices the angle of the fingers can be adjusted and held at any desired angle. The bracket D, in which the bearing for the shaft C' is formed, also serves the additional purpose of closing the space between the end of the shaker or screen and the upright frame-timber E, and permitting the movement of the shaker or screen behind the same, by which arrangement of parts the air is prevented from being drawn in or the dust or fine straw or grain thrown out at this point, and the injurious effects consequent thereon effectually prevented. The inner or receiving end of the slatted shaker or screen is provided with a short section of grating, G, the rods $g$ of which run lengthwise of the machine. These rods are connected to a cross-rod, $g'$, adjacent to the cylinder, having its bearings in the side bars of the shaker or screen frame, and in which bearing the grating is adapted to be turned. The side rods are provided with a projecting pin, $g^3$, for engaging slots formed in the side bar of the frame, and which pin is screw-threaded to receive a suitable thumb-nut, $g^4$, to permit the arm to be held at any desired point in the slot, and by which arrangement it will be seen that the grating may be adjusted at any angle with the beater, to retard the straw more or less, to insure the escape of all grain therefrom before the straw passes onto the slatted portion of the shaker or screen. By this construction and arrangement of parts it will be seen that the attendant is enabled to adjust the angle of the fingers in relation to the beater, according to the condition of the grain, and to thus subject it to a greater or less beating action. It will also be seen that by making the shaker or screen and its receiving end, and directly under the beater, in the form of a grating running lengthwise of the machine, a freer passage is provided for the escape of the grain to the lower shaker, as it is separated from the straw by the action of the beater thereon.

By mounting the grate in the shaker or screen it will be seen that a continuous shaking action is imparted to the straw as it falls thereon, which still further tends to separate the grain from the straw.

Other means than those above described for adjusting and holding the grating may be employed, if found desirable, without departing from the spirit or intent of my invention.

Having now described my invention, I claim—

1. In a thrashing-machine, the combination, with the beater and with the teeth for guiding the grain from the concave to the beater, of mechanism for changing and holding the teeth at different inclinations in respect to the beater, substantially as described.

2. The combination, with the thrashing-cylinder and concave and the lower shaker or screen, of the vibrating shaker or straw-carrier provided with the open grating at its receiving end, running lengthwise of said screen, for permitting the free escape of the grain as discharged from the concave to the lower shaker or screen, substantially as described.

3. The combination, with the beater, of the open grating running lengthwise of the screen, and arranged in the shaker below the beater, substantially as and for the purpose set forth.

4. The combination, with the thrashing-cylinder, of the vibrating shaker or screen having the hinged grating connected thereto at its receiving end, substantially as and for the purpose set forth.

5. The combination, with the beater and with the adjustable fingers for directing the grain thereto, of the adjustable grating mounted in the vibrating shaker or screen, and operating substantially as and for the purpose set forth.

6. The vibrating shaking-screen having the adjustable grating mounted therein, and provided with the slotted side, for permitting the adjustment of the grating, substantially as and for the purpose set forth.

7. The combination, with the vibrating shaker or screen and the upright fixed frame-timber, of the bracket D, for closing the space between the vibrating shaker or screen and the fixed timber, and forming a bearing for the shaft of the rocking fingers, substantially as and for the purpose set forth.

In testimony whereof I have hereunto set my hand this 4th day of October, A. D. 1883.

ANDREW J. HOAG.

Witnesses:
   ALFRED A. ELLSWORTH,
   FRANK W. DUNNING.